Figure 1:
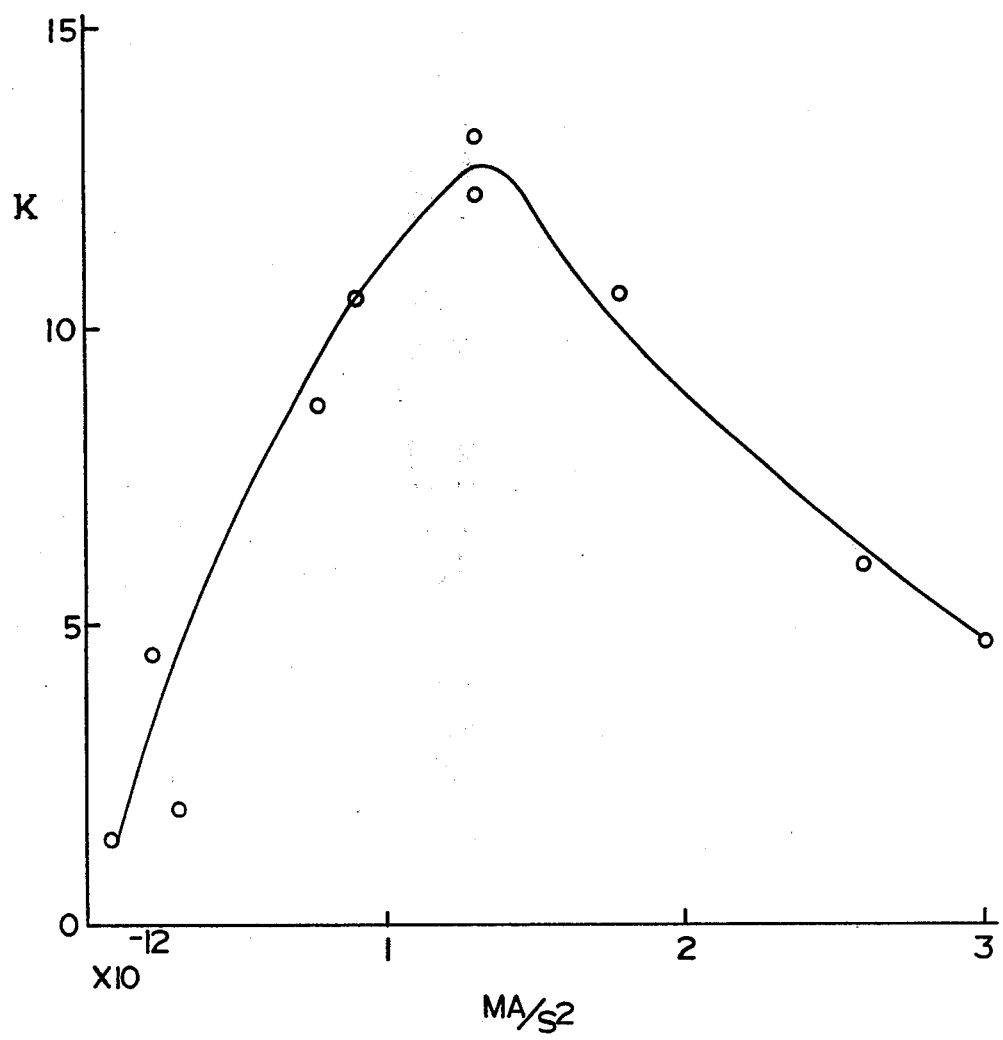

United States Patent [19]

Pasha et al.

[11] 4,204,980
[45] May 27, 1980

[54] METHOD AND COMPOSITION FOR REMOVING IODINE FROM GASES

[75] Inventors: Mohiuddin Pasha; David K. O'Hara; Joseph A. French, all of Lousiville, Ky.

[73] Assignee: American Air Filter Company, Inc., Louisville, Ky.

[21] Appl. No.: 647,333

[22] Filed: Jan. 8, 1976

[51] Int. Cl.$^2$ .................. B01D 53/04; G21F 9/02
[52] U.S. Cl. .................................. 252/428; 55/71; 176/37; 252/301.1 W
[58] Field of Search .............. 252/301.1 W, 428; 176/37; 55/71

[56] References Cited

U.S. PATENT DOCUMENTS

| 2,795,482 | 6/1957 | McNabney | 176/37 |
| 3,453,807 | 7/1969 | Taylor | 55/71 |
| 3,466,137 | 9/1969 | Ward et al. | 176/37 |

OTHER PUBLICATIONS

Hladky et al., "Use of Inorganic Sorbents... Plants", as abstracted in Nuclear Science Abstracts, vol. 31, #14068 (Mar. '75).

Primary Examiner—Benjamin R. Padgett
Assistant Examiner—Deborah L. Kyle
Attorney, Agent, or Firm—Jon C. Winger

[57] ABSTRACT

A method and composition for removing iodine and organic iodides from an iodine-containing off-gas stream is provided. The composition for the removal is a ceramic material impregnated with a mixture of a metallic salt with a water-soluble secondary amine. The method for removing the iodine and iodide is accomplished by passing the off-gas stream over the ceramic impregnated with the metallic salt-amine mixture.

1 Claim, 1 Drawing Figure

METHOD AND COMPOSITION FOR REMOVING IODINE FROM GASES

BACKGROUND OF THE INVENTION

This invention relates to a composition and means for removing iodine and organic iodides from an iodine-containing off-gas stream and more particularly relates to a composition which may be utilized in iodine and iodide removal. Even more particularly, the invention relates to a method of making a sorbent material for removing iodine and organic iodides from iodine and organic iodide containing off-gas streams.

In the development of nuclear powered electric generating plants, many new types of pollution problems have arisen. In the processing of radioactive materials in these plants great concern has centered around the removal of radioactive iodine, iodine-131, and its organic forms, particularly methyl iodide, and prevention of the escape of the radioactive material into the atmosphere. Presently, several types of filtering and adsorbing devices have been developed for removal of these radioactive iodine materials, the most commonly used material presently available being impregnated activated carbons. These activated carbons have proved to be effective adsorbents but they have had disadvantages because of the ever present problem of auto-ignition due to decay heat at high loadings. It has further been noted that the adsorbing characteristics of the activated carbon deteriorate on purging of the process off-gas and the radioactive iodine will move through the carbon filter. Also, it has been noted that when the off-gas stream contains appreciable amounts of moisture, the adsorption efficiency of an activated carbon or charcoal filter is greatly diminished. On the other hand, non-combustible carriers have also been proposed wherein the carrier is an adsorbent material such as silver zeolite, silicas, and aluminas which have been impregnated with metal salts, specifically silver nitrate. However, the cost of these products have been found to be extremely high.

SUMMARY OF THE INVENTION

It is an object of the present invention to provide a method for removal of iodine and organic iodides from off-gas streams from nuclear reactors. It is another object of this invention to provide a process for the preparation of a sorbent material for removing iodine and organic iodides from gas streams from nuclear reactors. It is still another object of this invention to provide a radioactive-iodine adsorbing material which may be utilized for removing iodine and organic iodides from off-gas streams from nuclear reactors. Other objects and advantages of this invention will become apparent to those skilled in the art upon consideration of the accompanying disclosure.

The present invention resides in the recognition that certain ceramic materials impregnated with mixtures of metallic salts and water-soluble secondary amines when coming in contact with radioactive iodine and radioactive organic iodides trap or adsorb these radioactive materials. It has been found that many ceramic materials of preselected surface area ranges when impregnated with the salt-amine mixture are susceptable to radioactive iodine adsorption when contacted by a gas stream containing radioactive iodine and organic iodide compounds, the most effective sorbent materials being those wherein the surface area of the ceramic material is between from about 5 to about 250 m$^2$/g. Furthermore, it has been found that the nitrate salts of silver, copper, cadium, lead, zinc, nickel, cobalt, cerium, and mixtures thereof when mixed with water soluble secondary amines and particularly morpholine, piperidine, piperazine, and triethylene diamine and mixtures thereof have strong affinity for chemisorption and binding of the radioactive iodines with the nitrate salts of silver in admixture with triethylene diamine being the most effective. Even though the exact reaction mechanism is not known, it is believed that the products of reaction between the amine containing compound upon going into solution with a metallic salt forms a metal-ammonium complex which is positively charged and upon contact with the radioactive iodine and organic iodides, particularly methyl iodide, these radioactive materials have an affinity to react whereby the I$^{131}$ replaces the ammonium in the complex according to the following equation:

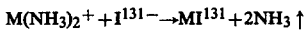

$$M(NH_3)_2{}^+ + I^{131-} \rightarrow MI^{131} + 2NH_3 \uparrow$$

Even further, it is noted that the percent by weight of the mixture on the ceramic material also has an effect on the affinity of the ceramic material for adsorbing radioactive iodine and iodide. For example, it has been found that ceramic materials impregnated with the salt-amine mixture wherein the salt is in the range of from about 1 to 4% by weight of the ceramic material and the amine is in the range of from about 2 to 5% by weight of the ceramic material have proved to be the most efficient. Also, it has been found that the most effective adsorbing materials are those containing silica or alumina and mixtures thereof and the salt-amine mixture is prepared by dissolving the salt and amine compounds with an organic acid, the salt and amine compounds being present in an aqueous solution.

One preferred radioactive iodine adsorbing material found useful in the present invention is a ceramic material having a surface area of from about 5 m$^2$/g to about 250 m$^2$/g wherein the ceramic material is selected from the group consisting of silica and alumina and mixtures thereof, the ceramic material being impregnated with a mixture of silver nitrate and triethylene diamine wherein the silver nitrate-triethylene diamine is in the range of from about 3 to 9% by weight of the ceramic material and the weight ratio of silver nitrate to triethylene diamine is from about 0.3 to 1.0.

According to the present invention, one preferred method for making a sorbent material for removal of iodine and organic iodides from an iodine-iodide-containing off-gas stream comprises the steps of: adding a preselected amount of metallic salt to a container containing a preselected volume of water with stirring until all of the metallic salt has gone into solution; adding a preselected amount of water soluble amine to a second container containing a preselected amount of water, the solution also being stirred until all of the water soluble amine has gone into solution; mixing the two prepared solutions and adding a predetermined amount of an organic acid, preferably acetic or propionic, to form a homogeneous solution of the salt and amine; impregnating a ceramic adsorbent material with the salt-amine solution by dipping a predetermined amount of the ceramic adsorbent material into the solution for a period from about 10 to 20 minutes; and, drying said impregnated material for about 6 to 8 hours at a temperature of from about 60° to 80° C.

Furthermore, according to the present invention, radioactive iodine and radioactive organic iodides are removed from a radioactive iodine-iodide-containing off-gas stream by passing the off-gas stream through a bed of sorbent material having a surface area of from about 5 $m^2/g$ to 250 $m^2/g$, the sorbent material being impregnated with a mixture of a metallic salt and water soluble amine.

A more comprehensive understanding of the invention can be obtained by considering the following examples. However, it should be understood that the examples are not intended to be unduly limitative of the invention.

EXAMPLES I-X

The following examples demonstrate the procedure that was followed in preparing a radioactive iodine adsorbing material and then utilizing the material in a radioactive iodine-containing off-gas stream.

EXAMPLE I

A first aqueous solution was prepared by adding with stirring, 3.0 grams of silver nitrate to a first beaker containing 50 ml. of water. Stirring continued until all of the silver nitrate had gone into solution. A second aqueous solution was then prepared by adding 4.0 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 8.5. About 0.4 ml. of 0.1 normal acetic acid was then added to the solution with the pH rising to 13.0 during the acetic acid addition. In about 10 minutes the solution was found to be clear and the pH was 11.0.

To the resulting solution, 100 grams of 1/16" extrusions of silica-alumina having a surface area of 230 $m^2/g$ was added. This mixture was stirred for about 10 minutes then dried in an air circulating oven for 6 hours at about 65° C.

The product was formed into a bed 2 inches in depth and placed into a radioactive gas stream containing 1.10 $mg/m^3$ of radioactive methyl iodide for 2.0 hours, the temperature of the gas stream being about 24.4° C. at a relative humidity of 95.5%. The exposed product was then purged with clean moist air at the aforementioned conditions for 2 hours.

It was found that the radioactive material removed from the gas stream was about 99.77%.

EXAMPLE II

A first aqueous solution was prepared by adding, with stirring, 2.5 grams of silver nitrate to a first beaker containing 50 ml. of water. Stirring continued until all of the silver nitrate had gone into solution. A second aqueous solution was then prepared by adding 3.5 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 8.0. About 0.3 ml. of 0.1 normal acetic acid was then added to the solution with the pH rising to 13.0 during the acetic acid addition. In about 10 minutes the solution was found to be clear and the pH was 10.8.

To the resulting solution 100 grams of 1/16" extrusions of silica-alumina having a surface area of about 250 $m^2/g$ was added. This mixture was stirred for about 10 minutes then dried in an air circulating oven for 6 hours at about 65° C.

The product was formed into a bed 2 inches in depth and placed into a radioactive gas stream containing 1.145 $mg/m^3$ of radioactive methyl iodide for 2 hours, the temperature of the gas stream being about 26.5° C. at a relative humidity of 95.6%. The exposed product was then purged with clean moist air at the aforementioned conditions for 2 hours.

It was found that the radioactive material removed from the gas stream was about 99.92%.

EXAMPLE III

A first aqueous solution was prepared by adding, with stirring, 2.5 grams of silver nitrate to a first beaker containing 50 ml. of water. Stirring continued until all of the silver nitrate had gone into solution. A second aqueous solution was then prepared by adding 3.5 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 8.0. About 0.3 ml. of 0.1 normal propionic acid was then added to the solution with the pH rising to 12.0 during the propionic acid addition. In about 10 minutes the solution was found to be clear and the pH was 10.5.

To the resulting solution, 100 grams of 1/16" extrusions of silica-alumina having a surface area of about 230 $m^2/g$ was added. This mixture was stirred for about 10 minutes then dried in an air circulating oven for 6 hours at about 65° C.

The product was formed into a bed 2 inches in depth and placed into a radioactive gas stream containing 64.03 $mg/m^3$ of radioactive methyl iodide for 7 hours, the temperature of the gas stream being about 33.3° C. at a relative humidity of 85.4%. The exposed product was then purged with clean moist air at the aforementioned conditions for 2 hours.

It was found that the radioactive material removed from the gas stream was about 99.95%.

EXAMPLE IV

A first aqueous solution was prepared by adding, with stirring, 2.0 grams of silver nitrate to a first beaker containing 50 ml. of water. Stirring continued until all of the silver nitrate had gone into solution. A second aqueous solution was then prepared by adding 2.5 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 9.0. About 0.3 ml. of 0.1 normal acetic acid was then added to the solution with the pH rising to 13.0 during the acetic acid addition. In about 10 minutes the solution was found to be clear and the pH was 11.0.

To the resulting solution 100 grams of 8-10 mesh granules of an activated alumina having a surface area of about 210 m²/g was added. This mixture was stirred for about 10 minutes then dried in an air circulating oven for 6 hours at about 65° C.

The product was formed into a bed 2 inches in depth and placed into a radioactive gas stream containing 0.45 mg/m³ of radioactive methyl iodide for 2 hours, the temperature of the gas stream being about 43.3° C. at a relative humidity of 95.7%. The exposed product was then purged with clean moist air at the aforementioned conditions for 2 hours.

It was found that the radioactive material removed from the gas stream was about 99.62%.

EXAMPLE V

A first aqueous solution was prepared by adding, with stirring, 2.5 grams of silver nitrate to a first beaker containing 50 ml. of water. Stirring continued until all of the silver nitrate had gone into solution. A second aqueous solution was then prepared by adding 1.5 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 8.0. About 0.3 ml. of 0.1 normal acetic acid was then added to the solution with the pH rising to 12.8 during the acetic acid addition. In about 10 minutes the solution was found to be clear and the pH was 10.9.

To the resulting solution 100 grams of 1/16" extrusions of silica-alumina having a surface area of about 230 m²/g was added. This mixture was stirred for about 10 minutes then dried in an air circulating oven for 6 hours at about 65° C.

The product was formed into a bed 2 inches in depth and placed into a radioactive gas stream containing 0.52 mg/m³ of radioactive methyl iodide for 2 hours, the temperature of the gas stream being about 43.3° C. at a relative humidity of 96.7%. The exposed product was then purged with clean moist air at the aforementioned conditions for 2 hours.

It was found that the radioactive material removed from the gas stream was about 98.36%.

EXAMPLE VI

A first aqueous solution was prepared by adding, with stirring, 2.0 grams of silver nitrate to a first beaker containing 50 ml. of water. Stirring continued until all of the silver nitrate had gone into solution. A second aqueous solution was then prepared by adding 5.0 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 9.0. About 0.4 ml. of 0.1 normal acetic acid was then added to the solution with the pH rising to 13.0 during the acetic acid addition. In about 10 minutes the solution was found to be clear and the pH was 11.0.

To the resulting solution 100 grams of 8-10 mesh granules of an activated alumina having a surface area of about 550 m²/g was added. This mixture was stirred for about 10 minutes then dried in an air circulating oven for 6 hours at about 65° C.

The product was formed into a bed 2 inches in depth and placed into a radioactive gas stream containing 0.0373 mg/m³ of radioactive methyl iodide for 2 hours, the temperature of the gas stream being about 22.8° C. at a relative humidity of 54%. The exposed product was then purged with clean moist air at the aforementioned conditions for 2 hours.

It was found that the radioactive material removed from the gas stream was about 92.9%.

EXAMPLE VII

A first aqueous solution was prepared by adding, with stirring, 4.0 grams of silver nitrate to a first beaker containing 50 ml. of water. Stirring continued until all of the silver nitrate had gone into solution. A second aqueous solution was then prepared by adding 4.0 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 9.5. About 0.5 ml. of 0.1 normal acetic acid was then added to the solution with the pH rising to 13.5 during the acetic acid addition. In about 10 minutes the solution was found to be clear and the pH was 10.5.

To the resulting solution 100 grams of 1/16" extrusions of silica-alumina having a surface area of about 230 m²/g was added. This mixture was stirred for about 10 minutes then dried in an air circulating oven for 6 hours at about 65° C.

The product was formed into a bed 2 inches in depth and placed into a radioactive gas stream containing 0.49 mg/m³ of radioactive methyl iodide for 2 hours, the temperature of the gas stream being about 26.7° C. at a relative humidity of 95%. The exposed product was then purged with clean moist air at the aforementioned conditions for 2 hours.

It was found that the radioactive material removed from the gas stream was about 96.3%.

EXAMPLE VIII

A first aqueous solution was prepared by adding, with stirring, 4.0 grams of silver nitrate to a first beaker containing 50 ml. of water. Stirring continued until all of the silver nitrate had gone into solution. A second aqueous solution was then prepared by adding 5.0 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 10.0. About 0.5 ml. of 0.1 normal acetic acid was then added to the solution with the pH rising to 13.5 during the acetic acid addition. In about 10 minutes the solution was found to be clear and the pH was 11.5.

To the resulting solution 100 grams of 1/16" extrusions of silica-alumina having a surface area of about 230 m²/g was added. This mixture was stirred for about 10 minutes then dried in an air circulating oven for 6 hours at about 65° C.

The product was formed into a bed 2 inches in depth and placed into a radioactive gas stream containing 0.61 mg/m³ of radioactive methyl iodide for 2 hours, the temperature of the gas stream being about 26.7° C. at a relative humidity of 95.6%. The exposed product was then purged with clean moist air at the aforementioned conditions for 2 hours.

It was found that the radioactive material removed from the gas stream was about 91.8%.

EXAMPLE IX

A first aqueous solution was prepared by adding, with stirring, 0.5 grams of silver nitrate to a first beaker containing 50 ml. of water. Stirring continued until all of the silver nitrate had gone into solution. A second aqueous solution was then prepared by adding 1.0 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 8.0. About 0.2 ml. of 0.1 normal propionic acid was then added to the solution with the pH rising to 12.8 during the propionic acid addition. In about 10 minutes the solution was found to be clear and the pH was 10.8.

To the resulting solution 100 grams of 8-10 mesh granules of an activated alumina having a surface area of about 210 $m^2/g$ was added. This mixture was stirred for about 10 minutes then dried in an air circulating oven for 6 hours at about 65° C.

The product was formed into a bed 2 inches in depth and placed into a radioactive gas stream containing 0.343 $mg/m^3$ of radioactive methyl iodide for 2 hours, the temperature of the gas stream being about 26.1° C. at a relative humidity of 95.7%. The exposed product was then purged with clean moist air at the aforementioned conditions for 2 hours.

It was found that the radioactive material removed from the gas stream was about 56.83%.

EXAMPLE X

A first aqueous solution was prepared by adding, with stirring, 1.0 grams of silver nitrate to a first beaker containing 50 ml. of water. Stirring continued until all of the silver nitrate had gone into solution. A second aqueous solution was then prepared by adding 2.0 grams of triethylene diamine to a second beaker containing 50 ml. of water, this solution also being stirred until all of the triethylene diamine had gone into solution. In a third beaker, the first aqueous solution and the second aqueous solution were admixed. Upon mixing the two solutions, a brown precipitate was formed and the pH of the resulting solution was found to be 8.8. About 0.3 ml. of 0.1 normal acetic acid was then added to the solution with the pH rising to 12.9 during the acetic acid addition. In about 10 minutes the solution was found to be clear and the pH was 11.0.

To the resulting solution 100 grams of 8-10 mesh granules of an activated alumina having a surface area of about 210 $m^2/g$ was added. This mixture was stirred for about 10 minutes then dried in an air circulating oven for 6 hours at about 65° C.

The product was formed into a bed 2 inches in depth and placed into a radioactive gas stream containing 0.43 $mg/m^3$ of radioactive methyl iodide for 2 hours, the temperature of the gas stream being about 27.8° C. at a relative humidity of 95.8%. The exposed product was then purged with clean moist air at the aforementioned conditions for 2 hours.

It was found that the radioactive material removed from the gas stream was about 69.7%.

In the aforementioned Examples, Examples I-IV show the removal efficiency was at least 99% which is a relatively high rate of sorption of radioactive iodine and Example V showed a removal efficiency of 98.36%, which is an acceptable rate of sorption of radioactive iodine and iodide. However, Examples VI-X were less than 97% efficient in bed depths of 2 inches, and such efficiency is generally unacceptable in nuclear installations.

FIG. 1, using the data from the Examples I to X above, is included to show the efficiency of the sorbent material is related to several factors; namely, the surface area of the sorbent material, the amount of metal salt in the impregnant, the total amount of impregnant, and the stay or contact time of the gas as it passes through the sorbent material. In the graph of FIG. 1, an empirical formula is derived in order to show how these factors relate to each other and by such relationships show the characteristics inherent in the most effective sorbent material. The curve is a plot of the index of performance (K) against the specific loadings of the impregnants ($MA/S^2$). In this plot, $K = [\log_{10}(100/P)]/C$ wherein P relates to the amount of radioactive material adsorbed by the sorbent material as determined by a test procedure to be discussed hereinafter and C is the contact or stay time of the gas in the sorbent material; that is, the ratio of volume of gas flow to flow rate through the sorbent bed. In the formula $MA/S^2$, M is the gram-moles of total impregnant; A is the gram-moles of metal salt; and, S is the surface area of the carrier in $m^2/g$.

In the determination of P, hereinafter referred to as the percent of penetration, P is defined as the result of the radiation measurement of radioactive material caught by the sorbent material of the present invention in relation to the amount of radioactive material that passes through and is caught by other known sorbent materials downstream. Thus, $P = 100[B/T + B]$ wherein T is the net true gamma count in the sorbent material of the present invention; and, B is the net true gamma count in the sorbent materials downstream.

In the procedure for measuring radioactive or gamma counts, a total of five beds of sorbent material, each being one inch deep, were constructed. The first two beds (test beds) were made of the sorbent materials used in the aforementioned examples, and the remaining beds (back-up beds) were made of known high efficiency adsorbents. The back-up beds used in the test examples were potassium iodide impregnated activated carbon.

The test beds were installed in a test chamber and the back-up beds were installed in series downstream from the test beds. The gas stream containing the radioactive material was passed through the five beds for the test period. After the test, a gamma count was taken on each bed with T being the count for the test beds and B being the count for the back-up beds. The adsorption efficiency for each test was then defined as (100-P).

The following table, Table 1, shows the calculations for the data for the graph shown in FIG. 1.

TABLE I

| EXAMPLE | SURFACE AREA OF SORBENT (S) IN $M^2/g$. | IMPREGNANT, $\frac{\text{Gm-moles}}{\text{Gm-solid}}$ | | | $\frac{MA}{S^2}$ | STAY TIME (C), SECONDS (Bed Depth) / Flow Rate | P, in % | K, $[\log_{10}\frac{(100)}{P}]$ / C |
|---|---|---|---|---|---|---|---|---|
| | | $AgNO_3(A)$ | Triethylene Diamine | Total (M) | | | | |
| I    | 230 | $1.764\times10^{-4}$ | $3.57\times10^{-4}$  | $5.334\times10^{-4}$ | $1.8\times10^{-12}$    | 0.254 | 0.23  | 10.39 |
| II   | 230 | $1.471\times10^{-4}$ | $3.125\times10^{-4}$ | $4.596\times10^{-4}$ | $1.28\times10^{-12}$   | 0.254 | 0.08  | 12.19 |
| III  | 230 | $1.471\times10^{-4}$ | $3.125\times10^{-4}$ | $4.596\times10^{-4}$ | $1.28\times10^{-12}$   | 0.250 | 0.05  | 13.20 |
| IV   | 210 | $1.176\times10^{-4}$ | $2.232\times10^{-4}$ | $3.408\times10^{-4}$ | $0.91\times10^{-12}$   | 0.233 | 0.38  | 10.39 |
| V    | 230 | $1.471\times10^{-4}$ | $1.339\times10^{-4}$ | $2.810\times10^{-4}$ | $0.78\times10^{-12}$   | 0.233 | 1.64  | 7.7   |
| VI   | 550 | $1.176\times10^{-4}$ | $4.464\times10^{-4}$ | $5.640\times10^{-4}$ | $0.22\times10^{-12}$   | 0.253 | 7.1   | 4.54  |
| VII  | 230 | $2.352\times10^{-4}$ | $3.571\times10^{-4}$ | $5.923\times10^{-4}$ | $2.61\times10^{-12}$   | 0.240 | 3.7   | 5.97  |
| VIII | 230 | $2.352\times10^{-4}$ | $4.464\times10^{-4}$ | $6.816\times10^{-4}$ | $3.03\times10^{-12}$   | 0.247 | 8.2   | 4.40  |
| IX   | 210 | $0.294\times10^{-4}$ | $0.893\times10^{-4}$ | $1.187\times10^{-4}$ | $0.079\times10^{-12}$  | 0.263 | 43.13 | 1.46  |
| X    | 210 | $0.588\times10^{-4}$ | $1.786\times10^{-4}$ | $2.374\times10^{-4}$ | $0.3164\times10^{-12}$ | 0.266 | 30.3  | 1.95  |

From the graph of FIG. 1, sorbent materials having a K value greater than 10 (Examples I–IV) possessed an efficiency greater than 99% and the $MA/S^2$ was in the range of $0.8\times10^{-12}$ and $1.8\times10^{-12}$.

What is claimed is:

1. A radioactive iodine-iodide sorbent material comprising a ceramic material impregnated with a mixture of silver nitrate and a water soluble secondary amine, said amine comprising triethylene diamine.

* * * * *